United States Patent
Lofall

(12) 
(10) Patent No.: US 6,484,109 B1
(45) Date of Patent: Nov. 19, 2002

(54) DIAGNOSTIC VIBRATION DATA COLLECTOR AND ANALYZER

(75) Inventor: Dean A. Lofall, Poulsbo, WA (US)

(73) Assignee: DLI Engineering Coporation, Bainbridge Island, WA (US)

(*) Notice: Subject to any disclaimer, the term of this patent is extended or adjusted under 35 U.S.C. 154(b) by 0 days.

(21) Appl. No.: 09/311,828

(22) Filed: May 13, 1999

Related U.S. Application Data

(60) Provisional application No. 60/090,873, filed on Jun. 26, 1998, and provisional application No. 60/086,131, filed on May 20, 1998.

(51) Int. Cl.[7] .......................... G01F 17/00; G01F 23/00
(52) U.S. Cl. .......................................... 702/56; 73/1.82
(58) Field of Search .............................. 702/56, 181, 82, 702/122; 73/660, 592, 778, 184, 122, 1.82, 35.09, 570, 644

(56) References Cited

U.S. PATENT DOCUMENTS

| | | |
|---|---|---|
| 5,633,811 A | 5/1997 | Canada et al. |
| 5,710,723 A | 1/1998 | Hoth et al. |
| 5,808,903 A * | 9/1998 | Schlitz et al. ................. 702/56 |
| 5,943,634 A * | 8/1999 | Piety et al. .................... 702/56 |
| 5,956,658 A * | 9/1999 | McMahon .................... 702/83 |
| 6,073,141 A * | 6/2000 | Salazar ....................... 707/204 |
| 6,098,078 A * | 8/2000 | Gehani et al. ............... 707/203 |
| 6,138,078 A * | 10/2000 | Canada et al. ................ 702/44 |
| 6,199,018 B1 * | 3/2001 | Quist et al. .................... 702/34 |
| 6,209,400 B1 * | 3/2001 | Schoch et al. ................. 73/778 |
| 6,304,882 B1 * | 10/2001 | Strellis et al. .............. 707/202 |

FOREIGN PATENT DOCUMENTS

| | | |
|---|---|---|
| EP | 0814590 | 12/1997 |
| WO | 9508809 | 3/1995 |
| WO | 9743729 | 11/1997 |

OTHER PUBLICATIONS

International Search Report for International Application No. PCT/US99/10678.

* cited by examiner

Primary Examiner—John S. Hilten
Assistant Examiner—Demetrius Pretlow
(74) Attorney, Agent, or Firm—Renner, Otto, Boisselle & Sklar

(57) ABSTRACT

A diagnostic vibration data collector and analyzer which incorporates an expert system within a portable computer such as a laptop or notebook type computer. The expert system analyzes vibration data acquired via a sensor coupled to the collector/analyzer in order to diagnose a condition of a machine under test. Several collector/analyzers may form part of a system in which peer to peer replication of data and information is performed so as to obviate the need for a central host computer and/or data base. Such system may include one or more stationary computers also serving as peers.

21 Claims, 7 Drawing Sheets

DIAGNOSTIC VIBRATION DATA COLLECTOR AND ANALYZER

CROSS-REFERENCE TO RELATED APPLICATIONS

This application claims priority to provisional patent applications Ser. No. 60/086,131, filed on May 20, 1998, and Ser. No. 60/090,873, filed on Jun. 26, 1998.

TECHNICAL FIELD

The present invention relates generally to vibration monitoring equipment, and more particularly to a vibration data collector and analyzer with diagnostic capabilities.

BACKGROUND OF THE INVENTION

Vibration is produced by moving parts of machinery due to causes like unbalance, misalignment of shafts and worn out bearings. Every machine has reasonable levels of vibration that are characteristic of its operation. Excessive levels of vibration indicate machine problems which may lead to unsatisfactory operation and eventual breakdown.

Machine malfunction can sometimes be detected by a change in the vibration pattern of that machine. In today's plants where machines are complex and/or large in number, engineers rely on more advanced methods of identifying abnormal levels and patterns of vibration in order to determine the condition of a machine. It is now common to measure the level and rate of the vibrations of machines and use this data to determine which machines require servicing. This monitoring technique is called predictive maintenance.

To properly employ predictive maintenance, vibration data is typically taken and recorded on a scheduled basis during normal use of the machinery. There are a number of systems available for this purpose. Many of such systems are designed around a pool of portable data collectors. Each individual data collector is designed to be transported to a machine to be tested. Vibration data from the machine is collected, and the vibration data is subsequently uploaded to a host computer. The host computer analyzes the vibration data in order to provide a system operator with advanced diagnoses. See, for example, U.S. Pat. Nos. 5 4,885,707 and 4,612,620.

Although such conventional systems have been useful in the past, there have been a number of drawbacks associated with such systems. For example, the portable data collectors have been limited in their ability to analyze the vibration data locally. The system host computer was required to carry out advanced analysis of the data subsequent to receiving the data from the data collector. This could result in analysis delays, and could further result in missed opportunities for avoiding impending machine failure.

Furthermore, such conventional systems have tended to rely heavily on the host/client relationship between the system host computer/database and the individual data collectors. In addition to performing the complex data analysis, the system host computer was required to store the system data and to provide schedule information and/or lists of machines which require predictive maintenance to the individual data collectors. If the system host computer were to fail for any reason, the predictive maintenance system as a whole could be effectively shut down. In addition, there could be instances where a communication link between the host computer and one or more of the data collectors could not be established (e.g., due to limited accessibility to telephone lines, failed communications equipment, etc.). Such dependency on a system host computer could thus become an impediment to a smoothly functioning system.

In view of the aforementioned shortcomings associated with conventional data collectors and systems, there is a strong need in the art for a data collector and system which no longer is dependent on a system host computer. There is a strong need for a data collector which is capable of performing its own advanced/complex analyses of vibration data.

Moreover, there is a strong need for a data collector and system which can operate without a system host.

SUMMARY OF THE INVENTION

A diagnostic vibration data collector and analyzer is provided which incorporates an expert system within a portable computer such as a laptop or notebook type computer. The expert system analyzes vibration data acquired via a sensor coupled to the collector/analyzer in order to diagnose a condition of a machine under test. Several collector/analyzers may form part of a system in which peer to peer replication of data and information is performed so as to obviate the need for a central system host computer and/or data base. Such system may include one or more stationary computers also serving as peers.

According to one particular aspect of the invention, a system for performing predictive maintenance is provided. The system includes a plurality of portable data collector/analyzers operatively configured to communicate with one another; and at least one medium for permitting the plurality of portable data collector/analyzers to communicate with one another at least periodically. Each of the portable data collector/analyzers includes a transducer for being attached to a machine included among a plurality of machines, and for producing an output signal indicative of vibration of the machine; circuitry for conditioning the output signal and converting it to vibration data; a memory having a database stored therein, the database including vibration data obtained from the plurality of machines; and a database replication engine for replicating data in the database with data in the database of each of the other of the plurality of portable data collector/analyzers, via the at least one medium.

According to another aspect of the invention, a method for performing predictive maintenance is provided. The method includes the steps of employing a plurality of portable data collector/analyzers to collect vibration data from a plurality of machines, and storing vibration data collected locally by each of the plurality of portable data collector/analyzers in a corresponding database included in each of the plurality of portable data collector/analyzers; and at least periodically replicating the data included each database of the plurality of portable data collectors with the data included in each database of the others of the plurality of portable data collectors.

In accordance with yet another aspect of the invention, a portable data collector/analyzer is provided which includes a transducer for being attached to a machine in order to produce an output signal indicative of vibration of the machine; circuitry for conditioning the output signal and converting it to vibration data; a memory having a database stored therein, the database including vibration data obtained from the machine; and a database replication engine for replicating data in the database with data in a database of each of a plurality of other portable data collector/analyzers.

Still another aspect of the invention relates to a system for performing predictive maintenance. The system includes a plurality of portable data collector/analyzers operatively configured to communicate with one another; and at least one medium for permitting the plurality of portable data collector/analyzers to communicate with one another at least periodically. Each of the portable data collector/analyzers includes a transducer for being attached to a machine included among the plurality of machines, and for producing an output signal indicative of vibration of the machine; circuitry for conditioning the output signal and converting it to vibration data; a memory having a database stored therein, the database including vibration data obtained from the plurality of machines; a database replication engine for replicating data in the database with data in the database of each of the other of the plurality of portable data collector/analyzers, via the at least one medium; and an expert system for performing advance vibration data analysis of vibration data based on information stored in the database.

According to yet another aspect of the invention, a portable data collector/analyzer is provided which includes a transducer for being attached to a machine in order to produce an output signal indicative of vibration of the machine; circuitry for conditioning the output signal and converting it to vibration data; a memory for storing vibration data; and an expert system for performing advance vibration data analysis of vibration data stored in the memory.

The invention comprises the features hereinafter fully described. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENT

Figure 1:
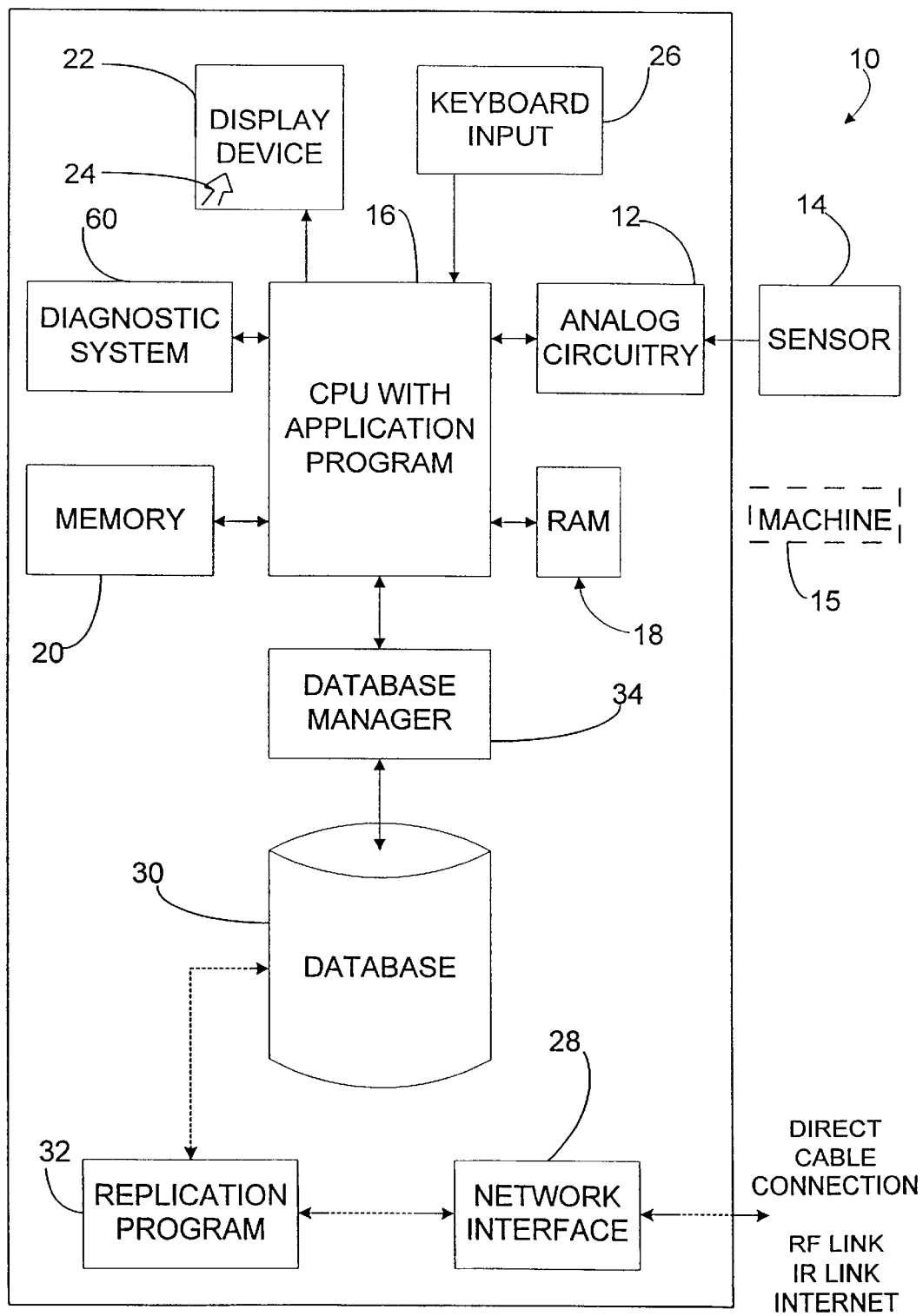
FIG. 1 is a block diagram of a diagnostic data collector and analyzer in accordance with the present invention.

The present invention will now be described with reference to the drawings, wherein like reference numerals are used to refer to like elements throughout.

1. Device

Referring initially to FIG. 1, a "Diagnostic Vibration Data Collector and Analyzer" (hereinafter the "Device") in accordance with the present invention is generally designated 10. The Device 10 provides a user with the ability to perform mechanical vibration-based machinery tests, to analyze the resulting data, and to apply automated methods of diagnoses on the resulting data. The Device 10 evaluates characteristics of the vibration data and provides a simple text output to the display. The text output reports the current condition of the machine, cites significant narrowband vibration characteristics, and presents machine repair recommendations.

The Device 10 includes electrical analog input circuitry 12 for the purpose of sampling mechanical vibration signals transmitted from sensors 14 (such as one or more accelerometers) that transform periodic, mechanical movement of a machine under test 15 into electrical signals. The analog input circuitry 12 is controlled by a digital signal processor (not shown) included therein.

The Device 10 further includes an application program executed by a CPU (collectively designated 16). In addition, the Device 10 includes random access memory 18 and mass storage memory 20 to store and run the Device software programs which are written to permit the Device 10 to carry out the operations described herein. The details regarding such software will be apparent to those having ordinary skill in the art of programming. Accordingly, further detail has been omitted herein for sake of brevity.

The Device 10 operates in a commercial operating system such as Microsoft Windows. The Device 10 allows the user to control easily the analog circuitry, analyze digital representations of the analog data, process and store this data. In addition, the Device 10 provides database management. The user's mechanical interface to the Device 10 includes a visual display device 22, a display device pointer (e.g., cursor) 24, a keyboard 26, operable switches (not shown), communications ports 28 and battery charger input.

The Device 10 provides a full spectrum of vibration analysis tools, including those to perform analysis of narrow band vibration frequency spectra, vibration time domain waveforms, demodulated vibration spectra, vibration phase data, etc.

The Device 10 stores, in a database 30, information about the physical information relating to the machine under test 15 (e.g., the industrial plant, equipment area, equipment, and vibration and operating data collection points). This information is stored in the form of binary data, numbers, text, diagrams, and digital images. The database 30 also stores historical vibration data, operating parameters, and machinery condition information. A complete database 30 is critical to meet the performance objectives of this Device 10.

Where multiple Devices 10 and stationary database installations (such as a main computer) are utilized within the same industrial plant, peer to peer database replication is utilized to keep the databases 30 of each of the respective Devices 10 synchronized with each other. Such peer to peer replication is discussed in more detail below in connection with FIGS. 2 and 3. The database replication program 32 is performed preferably by a physical, infrared light, or radio signal connection between individual Devices 10 via the network interface/communications port 28.

The Device 10 utilizes preferably a graphical user interface (GUI) that presents the database 30 physical and historical information to the user in a simplified manner. The different individual machines 15 are selected from a list or hierarchy of lists, and once selected the data may be analyzed in real time, collected, screened, trended or automatically diagnosed by the Device 10.

2. Relational Databases

The Device 10 preferably utilizes a structured query language, ODBC compliant database 30 managed by a database manager 34. This database 30 is made up of a number of tables and subsequent fields that describe the physical installation, machinery configuration, analog circuitry controls and stored data. The Device database 30 contains information commercially available from Predict/DLI of Independence, Ohio and Bainbridge Island, Wash. USA.

3. Database Replication/Consolidation

Figure 2:
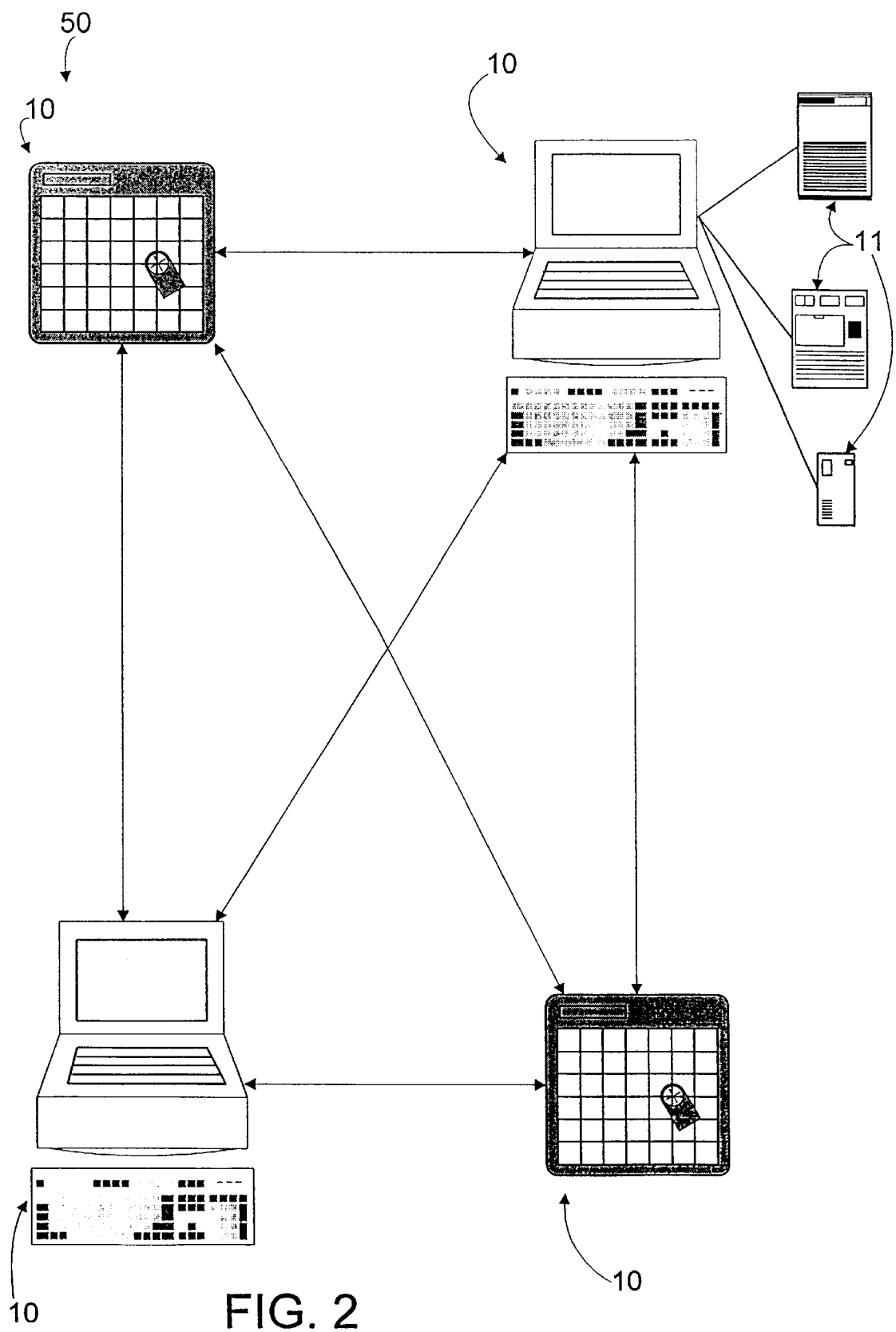
FIG. 2 is a schematic diagram illustrating peer to peer database replication among different devices in accordance with the present invention.
Figure 3:
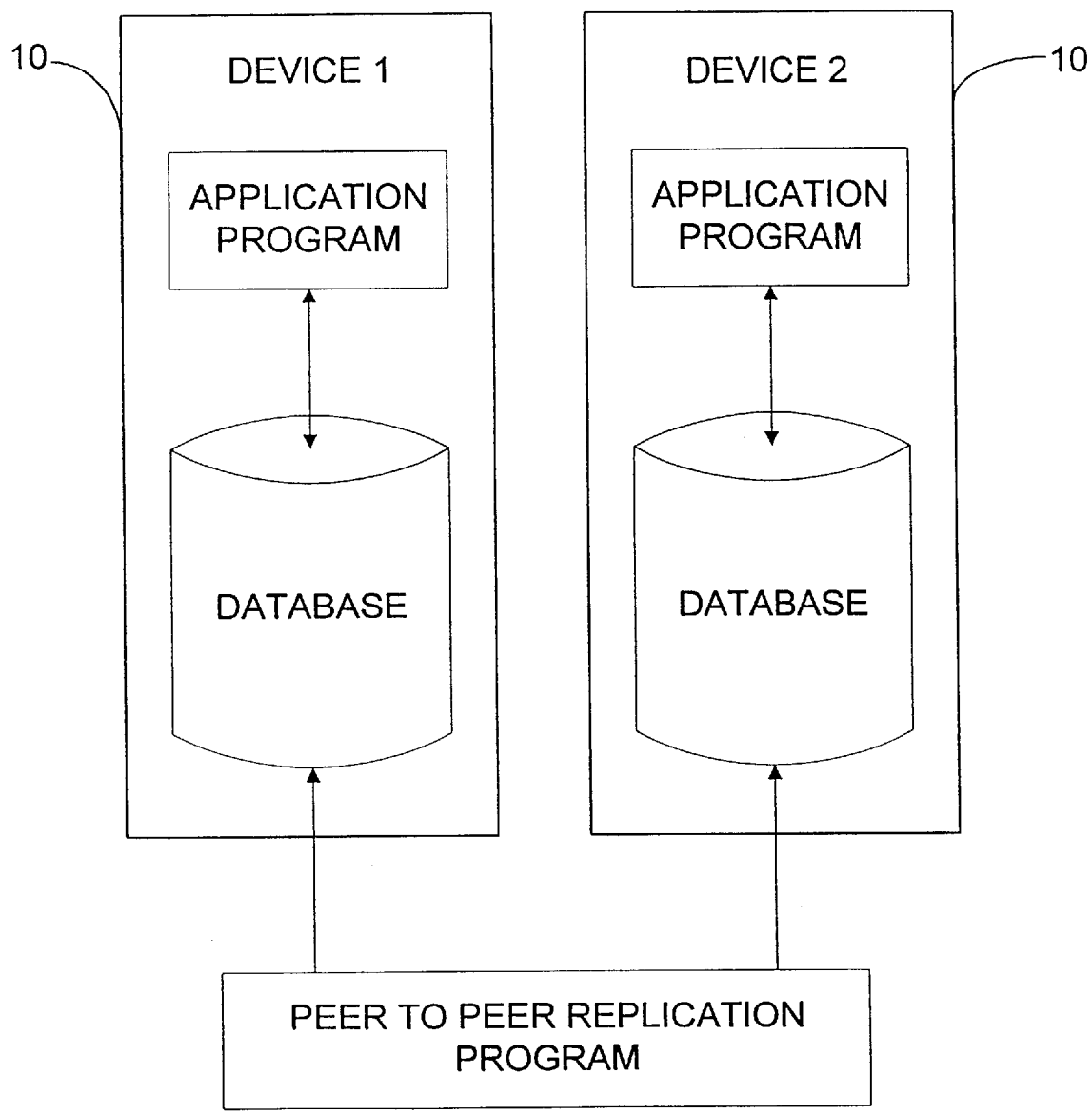
FIG. 3 is a schematic diagram illustrating in more detail the peer to peer database replication in accordance with the present invention.

Many of the industry's condition monitoring databases are stored centrally on a host computer or network database server as discussed in the background section above, and are accessed by the associated software systems via a local area network (LAN). The Device 10 utilizes a peer system 50 (FIG. 2), wherein each Device 10 and its database 30 are equal to other individuals within the system. Peer replication, or database synchronization, is a key function in the system 50 of individuals as represented in FIG. 2. Individual types include mobile computers, desktop computers and network computers operating in a client/server environment. Each of these individuals are no more the host than they are the client. As a result, each Device 10 includes all of the information necessary to perform high level functions and data analysis. In addition, each Device 10 can operate in the mobile environment, where it is fully functional despite being isolated from other devices 10. The system 50 also may include one or more conventional vibration data collectors 11 which operate as slave units within the system 50. The data collectors 11 may upload data to any individual Device 10 using the network interface 28 of the particular Device 10.

As pointed out above, in the past a shared database server (also the "host computer" as referred to herein) has been a potential point of failure. To protect database integrity, the server had to be backed up frequently which required complex and expensive hardware and software to manage redundant hard drive, tape or compact disk storage. The Device 10 utilizes a peer to peer replication method, with other devices 10 which may be portable, desktop, etc., so the system 50 does not require a central database server.

The system 50 allows the individual Devices 10 to work independently, which eliminates dependency of a given Device 10 on a common database or host service, as all Devices 10 are true peers. When the network connection to a common database is not available, the Devices 10 are not affected and continue to work normally, including exchanging modifications to shared data. When the network service and presence of other Devices 10 return, each Device 10 receives and shares all information that has changed since the last connection with another respective Device 10.

Each system 50 also allows automatic data redundancy (storing identical copies of the same database on multiple individual platforms, whether mobile or stationary), so that data integrity is preserved among the different Devices 10 even in the event of a failure of one of the Devices 10.

Decentralization of data collection and analysis activities is very important to today's condition monitoring activities. Machinery condition technicians are increasingly dispersed in multiple offices or mobile situations that bring them closer to the equipment that requires monitoring. As suggested above in the background, a key problem is that off-site personnel must access central databases through dialup or wide-area network (WAN) connections and can typically only use the data collection and analysis systems fully while staying connected. Current solutions cannot deliver access equal to an on-site workstation, primarily because these connections are slow. Alternatively, the remote workstation would need to operate as a true slave, where specific data collection "routes" are downloaded to a purpose-built data collector, then after data is acquired, uploads the "route" back to the host system. This method does not allow data processing and analysis at the remote site.

The Device 10 contains a secure distributed database environment designed to run on Internet and intranet network technology. The database replication will seamlessly operate in the background, allowing the Device 10 to continue with primary tasks. This replication method, represented in FIG. 3, may operate on a direct cable connection, across an infrared light connection, radio frequency network link, physical network connection, or direct or internet modem connection. Virtually, any two Devices 10 in the world could replicate over the internet without requiring custom or proprietary communications software. This infrastructure is significant for the Device 10, which does not require remote users to stay connected to a central host but does require an intermittent network connection so that it can synchronize databases transparently in the background with other Devices 10.

Data storage on today's mobile and stationary computers is quite inexpensive. A small, local hard disk may contain more than two gigabytes of memory. By seamlessly pushing condition monitoring data outward amongst individual Devices 10, the system 50 lets them make primary use of local hard disks, making the most of their existing hardware investment.

Providing generic database replication is a difficult and complex problem. The Device 10 accomplishes it by supporting replication controls that describe the database 30 in terms of how users work and collaborate, not just in terms of table rows and columns. Distribution rules are defined in terms of activities, which are sets of related information on which users need to collaborate; activities are the unit of collaboration. The Device 10 also uses other key innovations that simplify the task of generic replication.

The Device 10 replication manager 32 transparently manages all data sharing between respective individual Devices 10, ensures that information is always propagated efficiently and updates all Devices 10 in a timely manner. Because replication tasks always take place in the background, they do not affect observed system performance while replication is taking place. The Device 10 communications links are fully encrypted, so eavesdroppers cannot intercept or tamper with information as it is being transferred.

The Device 10 data sharing is fully transparent. It is invisible to users, because they are never forced to wait for transmissions to start or end to use their database 30, and always work normally whether they are currently on-line or not.

An important element of this invention is the ability of the Device 10 to access a local database, unload or share any new or modified data (machinery setup, vibration data, and results) with other individuals. Individuals are defined as any computer, whether mobile or stationary that has installed software to access the common database structure used as part of this condition monitoring system. Unlike current "route based" systems (See, e.g., U.S. Pat. No. 4,612,620), the Device 10 is not dependent on downloading a subset of instructions from a host to perform condition monitoring tests on machinery. Rather the Device 10 utilizes a complete copy of the condition monitoring database, traditionally associated with the host. In other words, there is no difference between the traditional host database and the database of the Device 10. To effectively share data with other individuals within a system of individuals, asynchronous database replication preferably is used.

The database replication used in the Device 10 can be defined simply as the process of generating common copies of the data within a network of individuals, whether mobile Devices 10, a common network database, or desktop PC work stations. This functionality is critical to many aspects of the invention, as many advanced functions of the Device 10 are not possible unless a complete condition monitoring database is present. Data replication can provide a wide spectrum of benefits, including redundancy of condition monitoring data, fast access to the local database, the ability to utilize a complete database while operating in isolation, and assurance that new and modified data will migrate to all locations.

Decentralization of data collection and analysis activities are very important to today's condition monitoring activities. Machinery condition technicians are increasingly dispersed in multiple offices or mobile situations that bring them closer to the equipment that requires monitoring. The key problem today is that off-site personnel must access central databases through dialup or wide-area network (WAN) connections and can typically only use the data collection and analysis systems fully while staying connected. Current solutions cannot deliver access equal to an on-site workstation, primarily because these connections are slow.

Alternatively, the remote workstation would need to operate as a true slave, where specific data collection "routes" are downloaded to a purpose-built data collector, then after data is acquired, uploads the "route" back to the host system. This method does not allow data processing and analysis at the remote site.

An important extension of the functionality of the Device 10 database replication includes replication over any network, including the Internet. Remote individuals will be able to utilize high quality data communications offered by local internet service providers (ISPs). This functionality will allow industry to localize vibration more effectively. Remote sites may connect to either a common server out on the Internet or through a company's Internet connection to a centralized server on site.

Replication between individuals may operate on a direct cable connection, across an infrared light connection, radio frequency network link, physical network connection, or direct or internet modem connection. Virtually, any two Devices 10 in the world could replicate over the Internet without requiring custom or proprietary communications software.

Some individuals will have analog circuitry installed, (which may be integral, a PCMCIA card, or external circuit boards) with software capable of accessing this analog circuitry, collecting data, processing data, and the ability to read/write to the condition monitoring database. Other individuals may have no analog circuitry, but will have software installed that will allow the user to process and analyze condition monitoring data and the ability to read/write to the condition monitoring database.

There are two fundamental categories of replication: synchronous and asynchronous. In synchronous replication, the replicated data is updated immediately when the source data is updated. This method requires that each individual in the system be continuously connected by means of a network. This method is not as practical for use in the Device 10, as quite often the individuals must be portable and allowed to operate in isolation.

Asynchronous replication, on the other hand, is a method in which the target database is updated after the source database has already been modified. The delay in updating can range from a few seconds to several days, depending on the configuration. However, the data eventually synchronizes to the same value at all database locations. When a particular Device 10 is not accessible, asynchronous replication allows requests for local processing to continue. For example, the user can perform data collection throughout the day in isolation, he or she can create new machinery setups and collect data. When connected to other individuals or a central database via a computer network, asynchronous replication will take place to bring all data current in each connected database.

Data Ownership

Data ownership is the concept of which individual has the ability to update the data. The type of ownership determines the need, if any, for conflict detection and resolution. For example, with master/slave ownership, only one individual may update the data. This methodology does not require conflict detection and resolution since only one site can modify the data. Other ownership models, as are discussed below, require the use of conflict detection and resolution since they allow multiple individuals to update information within the system.

i. Master/Slave Ownership

Master/slave ownership has many usage scenarios, including data dissemination, data consolidation, and point of responsibility ownership ii. Data Dissemination Data Dissemination describes an environment where data is updated at a central location and then replicated to individual read-only sites. For example, a bookstore chain may need to send updated price lists of available books on a nightly basis. To ensure this data is consistent, the stores have read-only access to the information while the headquarters has read and write capabilities. While this method is useful for systems that need to distribute information out to individuals, the Data Dissemination method is not as practical in the application of the data collection Device 10.

iii. Data Consolidation

Figure 4:
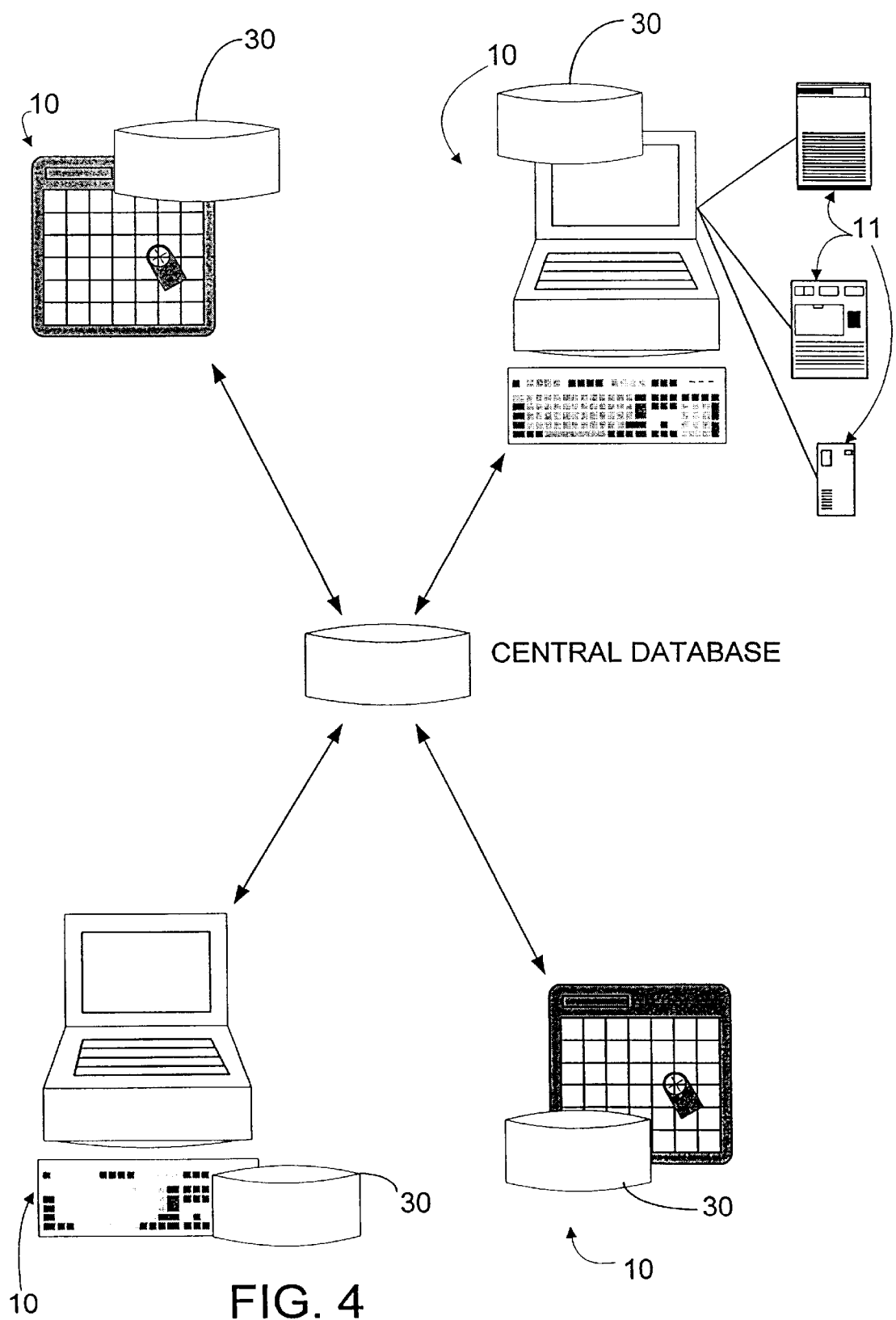
FIG. 4 is a schematic diagram illustrating data consolidation of individual devices in accordance with an aspect of the present invention.

Data Consolidation is characterized as an environment where data sets can be updated by individuals and then brought together in a read-only repository on the central database server as represented in FIG. 4. This method gives data ownership and location autonomy at the individual level. An example of this environment is a gas station chain that generates point-of-sale information during the day. Each individual gas station must copy this information to central headquarters on a daily basis. At the end of each day, this information is transmitted to headquarters and consolidated into the central data warehouse, which management can use to perform trend analysis on its business. This method can also be applied to a network of data collection Devices 10. During each day, the Devices are deployed into the plant or out to remote sites. At the end of the shift, the user connects to the common network, and the individual Device 10 will then replicate collected data to the central database server. Once centralized, this information can then be distributed to other individuals available on the network.

iv. Point of Responsibility Ownership

Point of Responsibility Ownership gives a maintenance department's database administrator the flexibility to assign ownership of data at the table partition level. This may be in a case where a single company with separate industrial sites could assign ownership of machines to personnel at the associated site. In this case, only the personnel at the local site could modify or add data to a local database, while another site could view the data, but could not modify or add any data.

Data Flow Ownership

V. Data Flow Ownership

Data Flow ownership allows the right to modify replicated data to advance from individual to individual. Like Master/Slave ownership, this model avoids update conflicts, while at the same time, and provides a more dynamic update technique. However, only one individual may update the data at a certain instant. Each individual is dependent on the data from the previous individual and may update the record according to its defined function. At the completion of each step, the information is updated and replicated to the next individual.

In a typical Data Flow example, a condition monitoring manager will create a machine record, defining test parameters and requirements. The machine record then becomes available to the data collection technician so data may be collected and processed. The un-reviewed machinery data records then become owned by the vibration analyst. Once the review is completed, the ownership would transfer to the maintenance manager. On completion of the review cycle, the ownership of the machine record would return to the data collection technician for future tests.

Peer Ownership

The Peer Ownership system is characterized as an environment where each individual's database is neither a master or slave. This system eliminates the data collector's dependency on a common database or host service, as all individuals are true peers. When the network service is not available, the individuals are not affected and continue to work normally. When the network service and presence of other individuals return, each individual receives and shares all information that has changed since the last connection.

Figure 5:
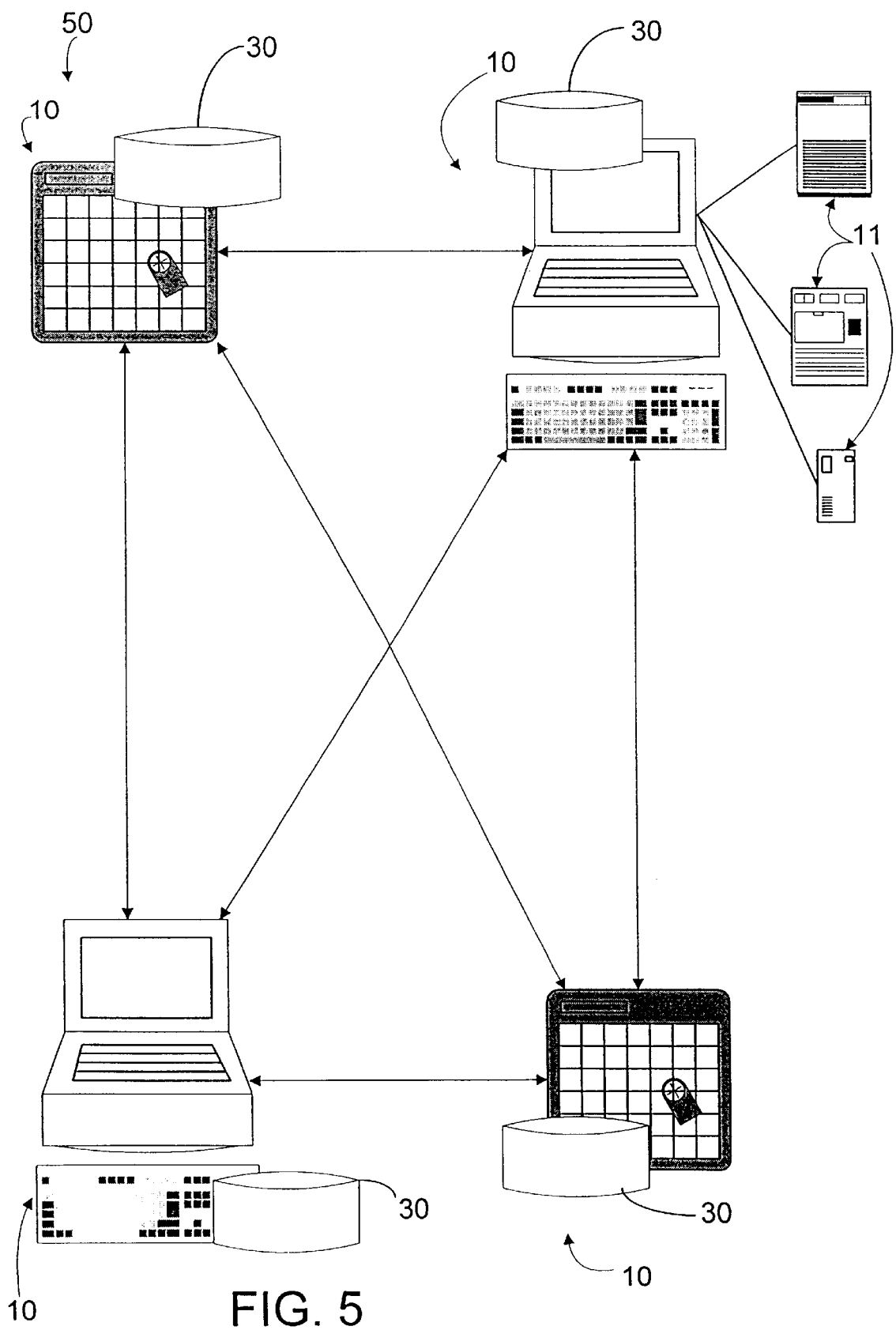
FIG. 5 is a schematic diagram illustrating in more detail peer to peer replication of individual devices in accordance with the present invention.

This model requires conflict resolution, as individuals are allowed to modify the database while operating remotely. The Peer to Peer replication, as represented in FIG. 5, supports controls that describe the database in terms of how users work and collaborate, not just in terms of table rows and columns. Distribution rules are defined in terms of activities, which are sets of related information on which users need to collaborate; activities are the unit of collaboration.

The Peer to Peer model also provides superior data loss protection than does the Consolidated model. A shared database server is a key potential point of failure. To protect database integrity, the server must be backed up frequently which requires complex and expensive hardware and software to manage redundant hard drive, tape or compact disk storage. Peer to Peer replication does not require a central database or database server. By design, this method provides automatic data redundancy (storing identical copies of the same database on multiple individuals), so that data integrity is preserved even in the presence of an individual's failure.

The Device's replication manager transparently manages all data sharing between individuals, ensures that information is always propagated efficiently and updates all individuals in a timely manner. Because Peer to Peer replication tasks always take place in the background, they do not affect observed system performance while replication is taking place. The Device's communications links are fully encrypted, so eavesdroppers cannot intercept or tamper with information as it is being transferred.

Figure 6:
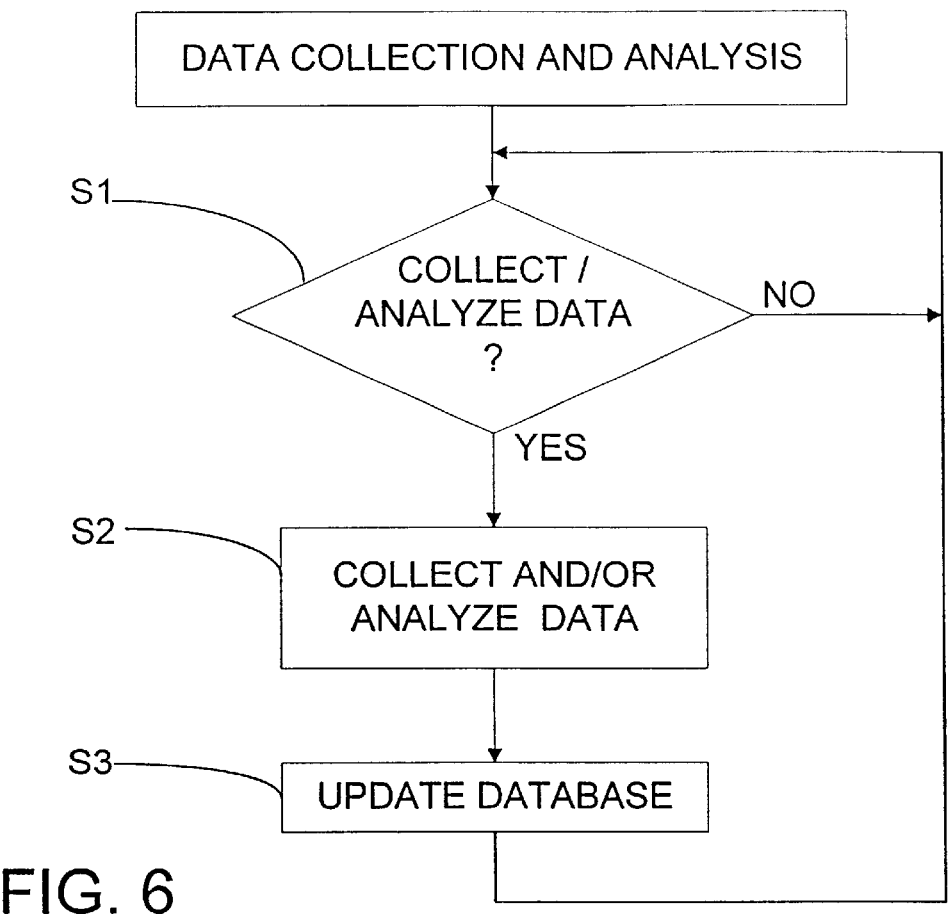
FIG. 6 is a flowchart representing the data collection and analysis routine carried out by each device in accordance with the present invention.

FIG. 6 is a flowchart which illustrates the data collection and analysis operation of each Device 10 in accordance with the present invention. In step S1, the Device 10 is programmed to determine if the user requests that data be collected/analyzed from a machine 15. If no, the Device 10 continues to loop through step S1. If yes in step S1, the Device 10 proceeds to collect and/or analyze data from the machine 15 as represented in step S2. If data is to be collected, the sensor 14 is used by the Device 10 to detect vibration data which is processed via the analog circuitry 12 prior to being stored in memory. Such operation is conventional and hence is not described in detail herein.

If data is to be analyzed by the Device as represented in step S2, the Device 10 employs an expert system included in the diagnostic system 60 to analyze the data in relation to the information stored in the database 30. The expert system is discussed in detail below and is generally known such as the "ExpertAlert" vibration analysis software and database commercially available from Predict/DLI. Prior to the present invention, however, such an expert system and database were not found in a vibration data collector such as the Device 10. Following step S2, the Device 10 proceeds to step S3 in which it updates its database 30 based on the data collection and/or analysis performed in step S2. The Device 10 then returns to step S1 as shown.

Figure 7:
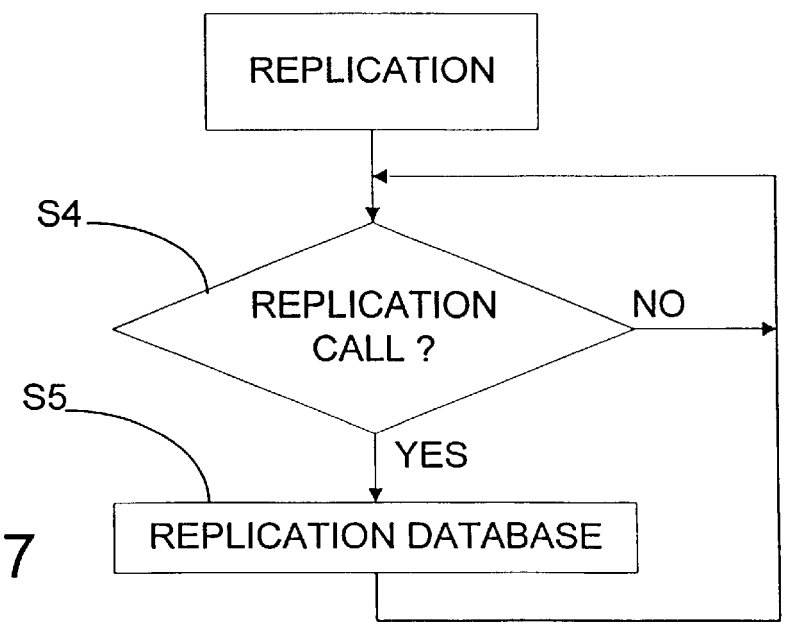
FIG. 7 is a flowchart representing the peer to peer replication routine carried out by each device in accordance with the present invention.

FIG. 7 illustrates the peer to peer replication process carried out by each Device 10 or other individual within the system 50. The particular replication process is carried out in the background as discussed above, so replication may occur even as data is being collected or analyzed. The only requirement is that the Device 10 be coupled to another individual in the system 50 via the network interface 28. In step S4, the replication program 32 determines if a replication call has either been generated locally or received from another individual in the system 50. If no, the Device 10 continues to loop through step S4. If yes in step S4, the Device 10 carries out peer to peer replication of its database 30, as represented in step S5, with each of the other devices active within the system 50 via the replication program 32.

EXAMPLE 1

Figure 8:
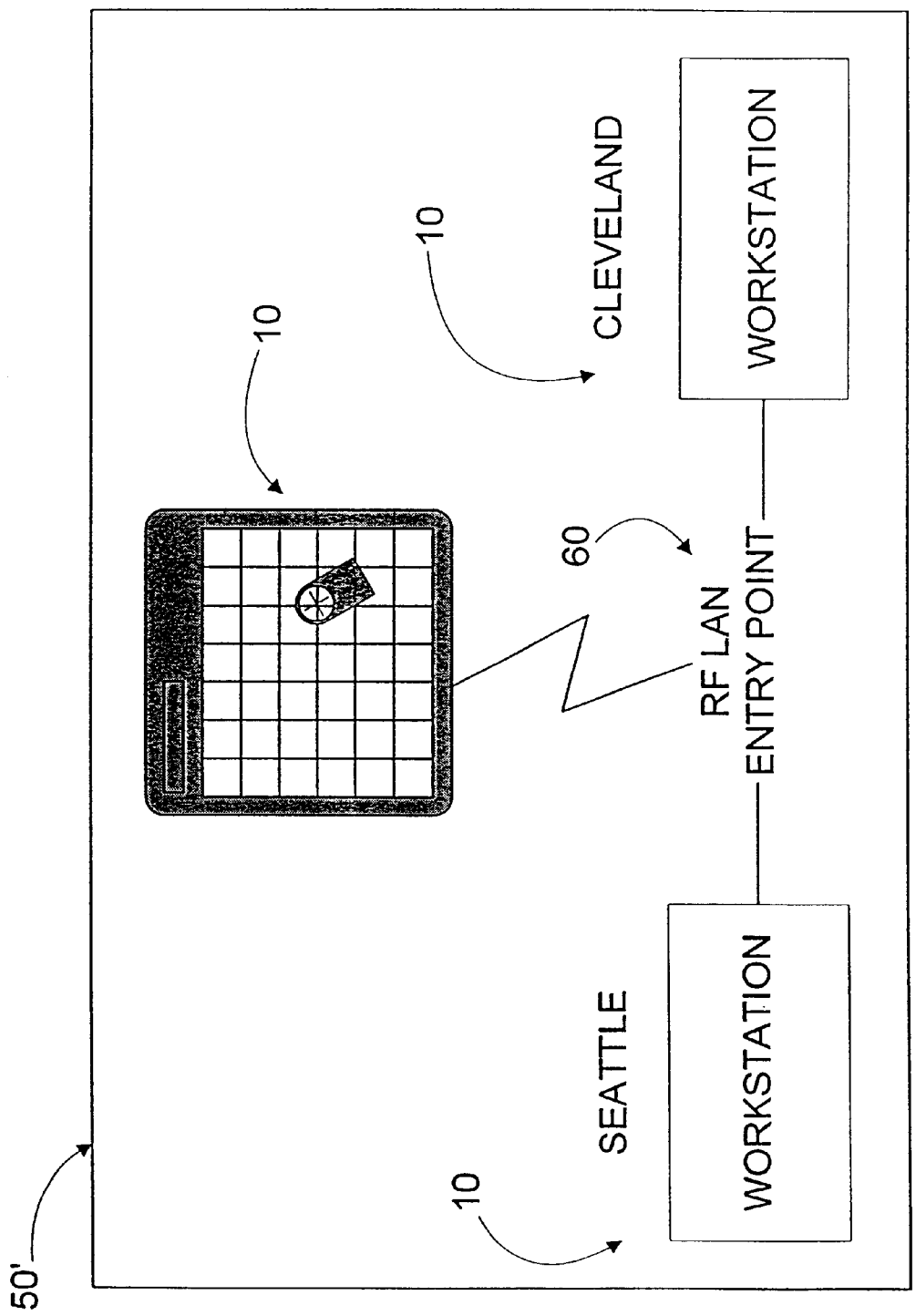
FIG. 8 is a schematic diagram illustrating an example of communications which occur among device s in accordance with the present invention.

FIG. 8 illustrates an example of a system 50' in accordance with the present invention. The system 50', for sake of simplicity, includes three sites. Two are permanent desktop computers 10' (which are functionally identical to the portable devices 10 with the exception of the ability to collect vibration data), one in Seattle and one in Cleveland. The two desktop computers 10' are coupled by a permanent TCP/IP network 60, and both desktop computers 10' are allocated IP addresses that uniquely identify the computers on the network.

A third computer on the network is a Device 10 as represented in FIG. 1. The Device 10 is connected to the network via an infrared (IrDA) port, for example, but may occasionally use a dial-up modem from remote locations.

Each computer 10' includes a database 30 and replication program 32 (FIG. 1) as does the Device 10. When a change is made at the Seattle site, initially the other two databases in the device 10 and the Cleveland computer 10' are unaware of such change. However, when any one of the devices begins a replication cycle (i.e., it begins replication as in FIG. 7), the replication program 32 on each device will see that a change has been made and will make the same change in the Cleveland computer 10' and the Device 10. If changes were made to all three databases 30, then those changes will be made to all three databases. After replication takes place, all three databases (as long as they are connected to the network) will have identical contents. If the Seattle site initiated a replication cycle when the Device 10 was not connected to the network, for example, then those changes are stored in memory until the Device 10 is next connected during a replication cycle.

The provision of the expert system diagnostics on board the Device 10 allows all users, even those with limited vibration experience, to analyze a variety of machines. These same users can screen large amounts of data, in a relatively short period of time. The Device 10, along with the other individuals in the system 50 or 50', each represent a tool that can be taught. By creating specific machine identifications, multiple machines of the same type are compared to each other. One average file is created for each specific machine group. All the machines in that group are compared to the one average. As the number of samples that the average file consists of increases within each database, or in other words the expert system learns, the more accurate the diagnosis.

The information which can thus be provided is very useful to the user. Still further, the peer to peer replication serves to get such information out to all the people involved. Though the today's broadcast media, E-mail, web technologies, paging and other network tools the diagnostic information sent to these people. This overcomes the long time lag and paper trail that used to come with getting the information to everyone.

EXAMPLE 2

A user starts his day by picking up his portable Device 10 in order to go out into the field to collect vibration data from various machines. Starting with his first machine, the worker connects the sensor 14 and starts a data collection routine. After the Device 10 is finished collecting data from a first location on the machine, the user will move onto the next location on the machine and begin data collection. When data for the complete machine is taken the expert system may automatically begin its diagnosis. If no mechanical fault was to be detected, then the user will move to the next machine. If a fault is detected, the severity would dictate the actions. For slight of moderate faults, the user would normally continue with the routine data collection. For faults of greater severity the action will depend on the type of networking available on site. For RF, the expert system would potentially send the automatic e-mails, to a pertinent people. For IR, a few well-placed Extended Systems Jet Eye's would allow for accessible network communications. Also one could use direct cable connect if necessary. Once the data is out, further action can be taken. If the user is a qualified vibration analyst he may perform real time data collection for further diagnosis of the machine, or compare it to other machines of the same type, thus confirming the expert system diagnosis. Or the user may simply turn the trouble machine over the maintenance mechanic/electrician for repair. With either course of action taken, the user can quickly screen the machines that he is currently working on, or any others in the database 30.

Diagnosis of machines depends largely on trending historical data and process information. Since each Device 10 includes its own diagnostic system 60 and database 30, the complete system is available to the user even out in the field. For advanced vibration analysis, all tools previously reserved for the system host computer are now at the machine level within each Device 10. These tools include different machines entire vibration history, all previous diagnoses, and a multitude of graphical analysis tools. Thus, the speed and accuracy of machine diagnosis is increased.

Database setup is easier by virtue of each Device 10 having the entire system (i.e., diagnostic system 60 and database 30) out in the field. Information regarding each particular machine to be tested can be setup by the users as they are looking directly at the machines. This leaves little room for interpretation as to the machine design, which is critical knowledge for proper diagnosis. Also while at the machine the first data set can now be collected. There is no need to go back to the host computer and load a data collector with the machine information. Since all of the machines for a given site are in the field with the user, there is no confusion as to whether machines have been loaded into the Device 10.

EXAMPLE 3

A user is setting up a new area in his collection of machines which are to undergo diagnostic testing. Normal methodology suggests carrying a laptop or a large notebook around the site, recording the important information, returning to the system host computer, loading the host computer and data collector, and then returning for collection of the data. This is very time consuming with multiple trips to the machines. With the Device 10, a user will select the test location points (on the machines) and place the accelerometer mounting pads appropriately. As the adhesive is curing, the user can setup the machine in the database 30 of the Device 10. By the time the user has built the machine into the database 30, the adhesive will be solid enough for data collection. This eliminates the time lag of returning to the host computer and loading a conventional data collector.

Though the peer to peer database replication engine 32, all users within a system 50 share information. This allows everyone to be active on the database 30. In other software applications it is necessary to copy database from one place to another. While in some applications this is acceptable, only one database can be active in making changes while the others are allowed only to view. With the replication engine 32 all users that need to make changes can at their individual database 30, then the information is shared in both directions.

EXAMPLE 4

In real world applications, with respect to a company with sites in Ireland, Spain and the United States, all three sites can share the information as well as make site specific updates. In Ireland, suppose the site is presently adding new machines to its database 30 via one of its Devices 10, for example. Suppose the US site previously had added identical machines in its database 30 months earlier, again via one of its Devices 10, for example, and already has an average file for the particular machine created. Since the sites share their databases 30 via replication among the Devices 10, the Ireland site would have the benefit of a mature system on the type of new machines being added by virtue of receiving the information that was collected at the US site. For example, one benefit is a more accurate diagnosis of machine problems.

In a similar scenario, in Spain a machine has a problem. In the Ireland the vibration expert has seen similar problems, he'll have total access to Spain's machine and its data by virtue of the replicated database 30. He can diagnosis the problem and return the pertinent information to the Spanish vibration expert, all by working locally within his particular Device 10. They essentially learn from each other, whether the sites are internal to one building or even in a different country.

4. User's Interface

The Device 10 user interface preferably utilizes the Windows™ Graphical Users Interface (GUI) as part of the computer processor 16 running the installed Windows™ operating system. The condition monitoring application program offers the user the ability to:

Navigate through all of the program's functionality.

Configure the physical industrial plant configuration, Plant areas and groups, machines, machine configurations, and test point information.

Develop sub-groups of machinery, such as selected survey groups, machines with faults, machinery requiring review, report groups, etc.

Select specific test types for a machine or groups of machines.

Start the automated diagnostics program.

Configure system parameters.

Print reports via a printer port (not shown).

View automated diagnostic results and fault trends on the display device 22.

Select Plants, Areas, Machinery, Test Points by means of a hierarchical tree, child lists and graphical icons.

Obtain the test parameter information from the database 30.

Send the data collection information to the analog circuitry interface 12.

Actuate the analog circuitry 12.

Send a graphical representation of the acquired data to the display 22.

Optionally store the resulting digital data to the Device database 30.

View and analyze on the display 22 a real time digital representation of the accelerometer signal that represents the vibration characteristics of the machine under test 15, including time waveforms; Demodulated spectral data; Frequency-based spectral data; Vector-based amplitude phase data; and Overall data.

Manually analyze the s stored digital data that represents the vibration characteristics of the machine 15, including time waveforms; Demodulated spectral data; Frequency based spectral data; Vector based amplitude phase data; Overall data Set up and store ad-hoc tests The Device 10 can run on multiple computer platforms. These include mobile, laptop, desktop and network computers, and most preferably the Device 10 is configured using a portable laptop or notebook style computer. The Device 10 operate on a computer with or without the analog front end. The most versatile embodiment is the mobile computer based Device 10 with a radio frequency network link. However, a networked, desktop computer may have the same functionality if located in close proximity to the machinery to be tested, and the analog circuitry is installed.

The analog circuitry 12 includes four-channels of accelerometer/analog input and advanced digital signal processing (DSP) capability. The analog circuitry 12 has multiple, single-ended ICP current source/accelerometer input/analog input channels. The ICP current source/accelerometer input/analog input channels has an ICP current source to provide excitation current to accelerometers. The ICP current source shall provide a constant current of 5 milliamps at 20 to 24 volts DC for each channel. Note: It is desirable to have as close to 24 volts as possible. The ICP current source is software switchable on/off. The analog circuitry 12 provides open cable fault detection by sensing interruption of the ICP current source and providing indication of detected open cable faults via the software interface. The analog circuitry 12 provides shorted cable fault detection by sensing the ICP current source short-to-ground condition (i.e., less than 6 volts), and providing indication of detected shorted cable faults via the software interface. The analog circuitry 12 accepts analog input signals on each channel within the range of −25 to +25 volts peak. The analog circuitry 12 accepts accelerometer input signals on each channel consisting of a ±7 volt peak signal on 8 to 12 volts DC. The analog inputs have an input impedance greater than 1 Megohm.

The analog circuitry 12 has two single-ended analog output channels. The primary intent of the analog outputs is to be able to audibly monitor a signal coming in from the inputs. The source for each of the analog output channels shall be independently software selectable from either a waveform generated from the digital signal processor therein, or from one of the digitized analog input channels.

The analog circuitry 12 preferably has a minimum of 1 digital input. The primary intent of this input is for tachometer pulse input. The digital input(s) shall be a standard TTL-level of 0 to 5 volts DC. The digital input(s) accept and are not damaged by signal levels of 0 to 15 volts DC.

The analog circuitry 12 provides between +10 and +35 volts DC at 25 milliamps for powering an infrared light, visible light, or laser tachometer. The analog circuitry 12 interfaces with a host computer via address, data, and control ICP Current Source/Accelerometer Inputs/Analog Inputs. Drivers are provided to operate the analog circuitry 12 on the computer in which they are installed. Analog circuitry drivers shall be available to operate on Microsoft Windows versions 3.1, 95, and NT. The analog circuitry 12 has an application programming interface (API) through which application software may control and access data from the analog circuitry. The analog circuitry API allows for complete access and control of the analog circuitry card, including, but not limited to, the following functions: Setting up analog circuitry parameters; Retrieving processed data; Defining output signal characteristics; Setting gains; Switching ICPs on/off; Switching integrators on/off; Mapping inputs back to outputs; Built-in-test results; Cable fault indication; Input signal clipping indication; and Programming the digital signal processor (DSP).

The analog circuitry 12 provides 76 dB signal to noise ratio, measured as level at clipping divided by wide-band RMS noise. The analog circuitry 12 provides a dynamic range greater than 85 dB. The analog circuitry provides 80 dB common mode rejection. The analog circuitry 12 allows no more than −76 dB inter-channel cross talk. The analog circuitry 12 provides a frequency range from DC to 20 kHz +0.2 dB. The analog circuitry 12 allows no more than ±0.2 dB passband ripple. The analog circuitry 12 provides phase match between channels better than 0.5 degree, from 0 to 20 kHz. The analog circuitry 12 provides broad-band RMS detection from 10 Hz to 1 kHz per ISO 2954-1975 (E). The analog circuitry 12 provides clipping detection of the analog inputs both before and after the integrator stage, and provide indication of detected clipping via the software interface. The analog circuitry 12 shall provide anti-aliasing via an analog RC filter plus a $64^{th}$ order digital FIR filter.

After entering the analog circuitry 12, but prior to entering the integrator stage included therein (not shown), each analog input channel passes through a selectable (i.e., bypassable) high-pass filter stage (also not shown). The high-pass filter stage shall be software-selectable between three configurations; 6 dB per octave with a 0.4 Hz cutoff frequency, 6 dB per octave with a 10 Hz cutoff frequency, and bypass (i.e., no filtering—feed signal directly to next stage). The high-pass filter stage configuration shall be selectable either on a per-channel basis, or with channels 1, 2, and 3 set together and channel 4 set independently. After entering the analog circuitry 12, but prior to entering the integrator stage, each analog input channel also passes through a selectable (i.e., bypassable) gain stage (not shown). The gain stage shall be software-selectable between three gain settings; a gain of 0.2, a gain of 1.0 (i.e., no gain), and a gain of 10. The gain settings shall be selectable independently for each of the analog input channels.

After passing through the high-pass filter and gain stages, but prior to entering an analog-to-digital converter stage (not shown) within the analog circuitry 12, each analog input channel shall pass through a selectable (i.e., bypassable) integrator stage. The integrator stage shall be software-selectable between two configurations, on/off, or integrate and bypass (i.e., no integration—feed signal directly to next stage). The integrator shall be selectable on/off either on a per-channel basis, or with channels 1, 2, and 3 set together and channel 4 set independently. The integrator shall have unity gain at 100 Hz, and be no more than 3 dB down at 5 Hz.

After passing through or bypassing the high-pass filter, gain, and integrator stages, the analog input signals are digitized in the analog-to-digital converter stage. The analog-to-digital converter stage provides simultaneous conversion of the analog input channels. The analog-to-digital converter, for example, provides 16-bit sampling resolution.

The analog circuitry 12 provides RMS level calculation from the integrated or non-integrated waveform from 10 Hz to 1 kHz. The analog circuitry provides the ability to program the DSP chip to perform other calculations such as Wavelet transform and Choi-Williams distribution.

The analog circuitry 12 provides simultaneous FFT analysis of the analog input channels up to 20 kHz span. The analog circuitry 12 provides the following FFT spans: 10, 15, 20, 40, 50, 80, 100, 150, 200, 400, 500, 800, 1000, 1500, 2000, 4000, 5000, 8000, 10,000, 15,000, 20,000. The analog circuitry 12 provides FFT Resolution at 50, 100, 200, 400, 800, 1600, and 3200 lines.

It will be appreciated that the various specific frequencies, spans, steps, etc. described herein are intended to be exemplary. The present invention is not intended to be construed as being limited to such specific examples in any way. The analog circuitry 12 provides FFT transform sizes of 8192, 4096, 2048, 1024, 512, 256, and 128. The analog circuitry 12 provides FFT transform size of 16,384. The analog circuitry provides the following triggering capabilities: Continuous (free run); Internally selectable for any input channel; Slope, rising or falling edge; Pre-trigger (Measurement start can be initiated from 1% to 100% of capture duration before trigger conditions are met.); Post-Trigger (Measurement start can be initiated between one and 65,536 samples after the trigger conditions are met.); External trigger through TTL pulse, rising or falling edge.

The analog circuitry 12 provides the following spectral window capabilities: Hanning, Hamming, Flat top, and Uniform. The analog circuitry 12 provides the following averaging types: Off, Single, Exponential, Linear, Peak-hold, and Peak-hold continuous. The analog circuitry 12 provides selectable overlaps of 0%, 25%, 50%, and 75%. Note: Overlap processing helps to improve data continuity when using Hanning and Hamming windows.

The analog circuitry 12 provides for interrupt processing. Note: In interrupt processing, a push button is connected to the tachometer input. When the button is pressed and held in, the auto ranging will start. If the button is released, the process stops. After the gain is set, and with the button still pressed, data acquisition starts. If the button is released, the block of data being processed is discarded. When the button is pressed again, data collection will restart at that point. The process can be repeated as many times as needed to collect the required number of averages. If, during this process, the button is released for 5 minutes, the process will time out.

The analog circuitry 12 provides a maximum capture size consistent with previously stated transform sizes. The analog circuitry 12 is able to collect a 50 Kb time record on a single channel for digital demodulation. The analog circuitry 12 is able to process the following spectrum types: Auto (power) spectrum; Phase spectrum between channel 4 and any of the three other channels; Coherence spectrum between channel 4 and any of the three other channels; and $H_1$ frequency response function between channel 4 and any of the three other channels.

The analog circuitry 12 provides power spectrum and RMS spectrum units. There is no need for complex, ESD, or PSD spectra in this application. In addition, the analog circuitry 12 provides Zoom analysis.

Time records shall have the windowing function applied before the FFT, but the displayed and stored waveforms will not be windowed. All analog inputs are able to be synchronous averaged in the time domain based on an external TTL trigger. The averaged waveform is able to be displayed and stored, and can be subjected to frequency analysis if desired. Averaging shall include up to 100 time records.

Digital demodulation shall be accomplished in the computer software using the Duncan Carter method. Note that this will require the collection of a time record of at least 50 k samples.

The analog circuitry 12 has built-in test capability to indicate via the software interface the operating condition of the analog circuitry 12 itself (i.e., whether the analog circuitry is operating normally or if any internal faults have been detected). The analog circuitry 12 does not require any external electronic adjustment.

Triaxial data collection is performed using the analog circuitry 12 as is discussed more fully in U.S. Pat. No. 4,885,707 to R. Nichol, the entire disclosure of which is incorporated herein by reference. The data collection may be barcode driven as is discussed in the aforementioned '707 patent.

Automated Machine Condition Fault Detection

There is a rich history of using vibration analysis as a tool to perform machine fault diagnosis. When automated diagnostics can be applied to known vibration analysis methods, the result is a powerful tool to determine machine susceptibility to various known faults. The Device 10 provides automated machine fault diagnosis to the user. This diagnosis is sent to the Device's display 22 and written to the database 30 for future printing or reference. The Device 10 includes a diagnostic expert system 60 the features of which are described in detail below. The expert system 60 applies known diagnostic techniques to the acquired data based on knowledge based information stored in the database 30. Such diagnostic techniques, however, were previously limited to a system host computer. These techniques were not employed by the data collectors themselves. The present invention, on the other hand, incorporates such diagnostic methods into the diagnostic system 60 of each individual Device 10. Some of the diagnostic methods are described below:

Fault Detection with a Rule-based Expert System

Machinery and Data Setup Each specific machine type is documented by a Vibration Test and Analysis Guide (VTAG). A VTAG is simply an accumulation of the necessary physical information on which vibration data acquisition and analysis are based. Included are: rated operating speed and nominal test speed (RPM); Reference RPM for order normalization, necessary for multiple shaft machines; Two spectral frequency ranges specified as multiples of the reference shaft speed; External schematic showing locations of vibration data test points; Internal schematic showing individual components and characteristic frequencies relative to the reference shaft speed; and Bearing types and specifications. Note: Analysis of ball bearing wear in this system does not necessarily depend on published or predicted frequencies.

Complete knowledge of all components forcing frequencies in the VTAG is not required to enable expert system analysis. However, the expert system accuracy and degree of report detail increase when more is known about the machinery.

Past practice has been to acquire data for all three axes at each test point. The axes are designated axial, radial and tangential (A, R, T). There is at least one test location and sometimes two per major machine component isolated by a flexible coupling. After many years of machine vibration analysis, applicant firmly believes that without tri-axial data, a significant number of mechanical faults will pass undetected, be misdiagnosed or given an improper degree of severity. However, the expert system can accept and analyze data acquired with single axis sensors such as ICP accelerometers and proximity probes.

Data Measurement

Vibration amplitudes are presented in terms of velocity decibels (VdB). Velocity is used because it is generally the best representation of the damaging forces associated with rotating machinery. VdB is a log scale referenced to 0 VdB $=10^{-8}$ m/sec RMS. Applicant believes that the log scale provides a better perspective of relative amplitudes than a linear scale such as inches per second or centimeters per second. With a linear scale, one or two prominent spectral peaks can dwarf other significant peaks such as ball bearing tones or auxiliary shaft rate harmonics that may indicate a serious fault.

The expert system structure, while initially designed to accommodate vibration spectral data, also can accept any numerical value such as temperature, pressure, flow, electrical current, time domain vibration data, phase angles and so forth.

In an order normalized graph, the abscissa is in multiples of machine fundamental speed rather than Hertz or CPM. Data for each machine test location and each of the three axes are represented by two spectra: A low order range, say 0 to 10 times rotational rate; and a high order range, say 0 to 100 times rotational rate. Thus machine generated vibration peaks lie at the same point on the frequency scale regardless of minor differences in operating speed. For multiple shaft machines, one shaft is tracked as the first order reference speed and frequencies related to the other shaft or shafts are determined by known relationships.

The expert system within the diagnostic system 60 automatically finds the running speed of each machine. Order normalizing allows the analyst or expert system to quickly identify peaks at machine characteristic frequencies that are -fixed multiples of rotational rate. Order normalizing also allows the expert system to readily identify probable bearing tones and to detect rotational rate sidebands.

Most important, order-normalization allows the creation of an average data file for each specific machine type. Vibration signatures for many identical machines taken at different times and at slightly different operating speeds can be accumulated statistically and represented by a single set of averaged narrow band spectra. These historical spectra are a very useful part of an analytical database. By comparing a spectral peak's amplitude to the corresponding peak in the averaged spectrum, one can determine whether the amplitude is significant.

The expert system uses accumulated average data as a baseline for automated analysis. This approach, unlike user-set alarms or factory pre-set standards, allows the machines themselves to define an acceptable level of vibration. Average spectra are composed of normalized vibration signatures of relatively healthy machines that are physically identical. In a set of 24 averageable signatures, for example, the average and sigma (one standard deviation) values are computed for the 24 vibration amplitudes at each of the 500 frequency bins of data. Since the signatures already have been order normalized, each frequency bin corresponds to a fixed multiple of rotational rate. Statistically, for a large number of samples, there is an 85% chance that a given peak will not exceed the average plus sigma amplitude if the machine is relatively healthy. Experience suggests that spectral peaks generally do not warrant consideration for mechanical fault diagnosis unless they exceed average plus sigma.

In 1983, computer aided screening of vibration data was developed by DLI Engineering, to provide a matrix summary of spectral peaks as a timesaving aid to human analysts. The same screening routine is incorporated in the expert system and produces a screening output table which includes the following information for each test location and axis: Amplitudes at each of ten pre-selected, specified orders, which are referred to as screening criteria or fault codes. Simple examples of specified orders include 1× and 2× (one and two times rotational rate), MB (motor bar pass rate), PV (pump vane rate), GR (reduction gear mesh rate), and FDN (foundation resonance); Amplitude and rotational rate order of the two highest peaks in each of the low range and high range spectra, excluding the ten specified peaks; and a "floor" level below which are the amplitudes of 75% of the remaining spectral lines of the high range spectrum. For each of the above, the change in amplitude from the previous survey and its deviation from average plus sigma.

Thus, there are 14 distinct peaks plus the "floor" noise level tabulated for each axis or 84 peaks for a machine with two data test locations. Screening tables typically are printed as a convenient source of data review, along with the spectral graphs, for those who wish to examine the basis for the expert system report.

DLI recognized in 1987 that, when examining the four columns of unspecified maximum peaks in the screening table, the computer and sometimes the analyst would have difficulty distinguishing between ball bearing tones and random peaks of lesser consequence. Thus a routine was developed to detect and identify harmonics and sidebands, that is, any significant series of regularly spaced peaks in the frequency spectrum. DLI used cepstral analysis.

A cepstrum can be defined simply as the spectrum of a spectrum. The cepstral signatures are in the time scale with distinct peaks at the periods of vibration corresponding to regular frequency spacing in the spectrum. Characteristic peaks in the cepstral data occur at positions corresponding to frequencies at which there exists a strong series of peaks or spacing in the spectrum. A machine with a faulty anti-friction bearing may show a harmonic series of peaks with 3.12 times rotational rate spacing in the spectral data (i.e. peaks at 3.12, 6.24, 9.36 . . . etc.). This series of peaks would then show up in the cepstral data as a single peak at a position corresponding to the frequency of 3.12 times rotational rate. The four highest fundamental peaks in the cepstral signatures between 2.0× and 8.0× are extracted. Correspondence between cepstral data and screened spectral data is checked systematically by numerous comparisons between the fundamental cepstral peaks and their harmonics and 1×sidebands, and the screened spectral peaks. If a positive correlation is found, the corresponding peaks may be considered bearing tones if other criteria are met.

Techniques for Rulebase Development

In the course of reviewing mechanical fault diagnoses and screening output tables, DLI noted that the specific peaks that reflect the faults generally are well represented in the screening tables. The tabular format of the screening program output conveniently allows for a tabular approach to applying diagnostic rules. For each specific mechanical fault diagnosis, there are particular cells of data in the screening matrix that, alone or in conjunction with other cells, provide varying degrees of positive or negative influence in citing that diagnosis. The screening matrix, along with knowledge of the machine configuration, provides enough information to diagnose nearly all mechanical faults evident in a machine's spectrum. These two bases of data serve as the key input to the diagnostics program. Using an approach that is both logical (what an analyst would expect to see) and empirical (based on a great deal of previous data and diagnoses), DLI transformed screened data into a suitable format to be used as an input matrix, and applied diagnostic rules in a similar format.

A fundamental assumption used in the expert system is that the health of the machine as a whole can be assessed by isolating the spectral data pertinent to each major component and, based on the data, diagnosing faults by component. In assuming this, one is essentially drawing focus to the test point or points at, and adjacent to, a particular component and gathering a set of data from the screening matrix pertinent to the analysis of that component. Comparison of spectral data of the component being analyzed to equivalent data at tests of adjacent components allows the expert system to determine which component is the most probable source of the detected fault. This concept is particularly useful for imbalance and bearing wear diagnoses. Proper identification of the major components of a given machine and the location of test points in relation to each component is key to this type of approach and is accomplished through a system of numerical coding.

Details of machine configuration such as minor component arrangement, types of bearings, gearbox details and coupling types are stored in the knowledge base via a component coding scheme. This scheme assigns a numerical code to each known type of arrangement and, along with the code, the test location numbers associated with the component. Major component groups have been defined as follows: Close-coupled Machines; Turbines; Motors; Gearboxes; Linked Drives (belt or chain); Centrifugal Pumps; Rotary Thread/Gear Pumps; Rotary Sliding Vane Pumps; Reciprocating Pumps; Centrifugal Compressors; Reciprocating Compressors; Screw Compressors; Lobed Blowers; Generators; Purifiers; Couplings; Diesel Engines; Marine Propulsion Gearboxes; and Machine Tool Spindles.

Analysis of each of the major component groups requires that a unique set of frequencies of interest be extracted from the screening matrix and examined. There are two basic Expert system processes that lead from the screening output matrix to the diagnostic report. The first process transforms the screening matrix into a set of Component Specific Data Matrices (CSDMs). The second process analyzes the vibration data in each CSDM by passing the two-dimensional array of numerical values (vibration amplitudes and exceedances of average) through a series of diagnostic rule templates that serve to pass or fail each individual fault diagnosis and compute a relative severity. Testing a motor driven centrifugal pump with a coupling, for example, the single screening output matrix of the test spectra would be transformed into three CSDMs (motor, coupling, pump). Each CSDM; in turn, would then be processed through a whole series of diagnostic rule templates pertinent to that major component group.

The CSDM has a form similar to the screening matrix in that its rows are designated by test location and axis, with vibration amplitudes and exceedances of average plus sigma. Furthermore, there are rows designating similar data for adjacent components and the differences between components. Column designations go beyond individual peaks at specified orders. In transforming the information given in the screening matrix, the specified orders are consulted for principal frequencies of interest such as shaft rotational rate, pump vane rate, gear mesh rates, turbine bucket rates and so on. Harmonics of such principal frequencies are also examined as well as rotational rate sidebands off the principal frequencies and their harmonics. The screening matrix specified orders rarely contain all frequencies sought by the CSDM generation program and when a frequency is not found or expected as a specified frequency, the unspecified maximum peak orders are checked to see if their frequency is that sought. This method allows for the filling of many more frequency columns in the CSDM than are specified in the screening matrix.

Ball bearing wear for various major component groups is detected by generating columns in the CSDM tables that include peaks from the unspecified maxima in the screening matrix that are non-integer orders of rotational rate and have been flagged by the cepstrum harmonic analysis. Prominent, known bearing tones identified in the average spectra sometimes are also included as a specified order.

For each major component group, the CSDMs have a unique form allowing for the identification of each element in the matrix by row and column numbers. Using gearboxes as an example, row 4 column 15 may be the radial axis amplitude (row 4) at the second reduction gear mesh frequency (column 15) for a specific test point. Each diagnostic rule template is keyed to this row and column specification and consists of sets of logic symbols addressing specific row-column elements of the CSDM and up to 5 more specific rules which test the data through inequalities. The logic symbols used are assigned a row-column address and act as qualifiers for each rule template. If the logic symbols are satisfied and the specific inequality rules are satisfied, the template passes and the diagnosis is considered true. Their placement in the rule template is easily edited using a simple menu driven template editing system. Each logic symbol can be assigned to any vibration amplitude or exceedance of average plus sigma in a CSDM. Rule templates also can incorporate up to 5 inequality rules which enable the user to compose if/then statements, to add elements of the CSDM together or to ensure that certain amplitudes or exceedances are greater than or less than others.

Once a fault diagnosis is declared, a relative severity needs to be determined. It is noted that the indication of a fault at the "slight" stage, before any repair recommendation would be warranted. Consider a hypothetical and simple case: Assume that in order for the diagnosis to be indicated positive, the vibration amplitude for that frequency, test location and axis must be at least 95 VdB as well as 6 VdB greater than the corresponding average plus sigma amplitude in the average spectra for that specific machine type. It is reasonable to assume that a higher amplitude, and thus a greater margin beyond these thresholds, indicates a higher degree of fault severity. Therefore, a diagnostic score is defined as the margin (in VdB) of actual values over the threshold values. In this simple case, an actual amplitude of 106 VdB that is 12 VdB greater than average plus sigma is 11 VdB (106–95) above the amplitude threshold and 6 VdB (12–6) above the exceedance threshold and thus has a diagnostic score of 17 (11+6). If one were to apply the diagnostics program to thousands of archived spectra and produce 45 positive indications of our hypothetical diagnosis, then the diagnostic scores could be correlated with the manually reviewed results of fault severity. This investigation, tempered by judgment, may produce the following conclusion:

| DIAGNOSTIC SCORE | SEVERITY | REPAIR PRIORITY |
| --- | --- | --- |
| 0 to 10 | Slight | No Recommendation |
| 11 to 30 | Moderate | Desirable |
| 31 to 60 | Serious | Important |
| >61 | Extreme | Mandatory |

The score of 17 in such example would produce a "moderate" severity of this fault. Consider that this principle applies to any number of designated values of amplitudes and exceedances.

The linear numerical scoring system used to determine fault severity is well suited to provide trending of severity over time, from survey to survey. For each specific mechanical fault diagnosis that is detected at least to a "slight" degree for a given machine, the severity score can be plotted using time as the abscissa. The ordinate does not directly reflect the numerical score. These remain internal to the program. However, dividing the trend plot into horizontal bands of "slight", "moderate", "serious" and "extreme" serves to normalize the severity scores among the various diagnoses. Thus multiple faults can be trended independently for a machine on the same graphical plot. Repair decisions can be made based in part on a combination of absolute fault severity and its rate of increase, and in part on the type and number of indicated faults.

A routine was developed to create and edit diagnostic rule templates easily and directly using the expert system. A menu driven process allows for the selection of a major component group and direct entry of the following parameters: Diagnosis name and number; Severity number (to set the scale); Machine orientation; Logic symbols and thresholds; Applicable component codes; and Inequality rule types and parameters.

Furthermore, CSDM definitions can also be edited so that new CSDM columns can be added or existing columns can be modified quickly and easily for any major component group. Screening criteria (the ten specified orders of the screening table, known in the expert system as Fault Codes) also are easily changed.

In order to maintain and improve diagnostic templates and the other input data files, a development database was developed composed of over 10,000 machine tests. The archived order-normalized spectra are periodically screened, transformed into CSDM tables and stored in computer files. The report results for these past surveys, all of which have been analyzed or reviewed manually, are also stored in a database. After the diagnostic rules application program is applied to the 10,000 sets of data, another computer routine sorts through the indicated faults and groups the results by diagnosis. For each result there is a diagnostic score and severity (Slight, Moderate, Serious, Extreme), determined by the expert system, followed by the repair recommendation (if any) and priority (Desirable, Important, Mandatory) as determined previously by an analyst. The latter are obtained by the computer from the report database.

Adjustment of the diagnostic templates and rules is accomplished by correlating the expert system results with past report results. Apparent inconsistencies and errors by the human analysts are taken into account. In some cases, inequality rules and/or logic symbols have to be added, deleted or changed in order for a particular diagnosis to be cited or eliminated. Thresholds are occasionally raised or lowered. In other cases, increasing or decreasing the severity scale is necessary. When an individual test result requires a rule change for the test result to be satisfactory, it is too easy to edit the rule to change that one result. One must see how the rule change affects the "world". Thus the revised (or new) rule is passed through the 10,000 machine test file to determine consistency and overall correctness of the rule change.

The expert system within the diagnostic system 60 uses a routine which allows the user to describe a machine by answering simple questions regarding configuration. As long as the machine can be represented by the existing database, screening criteria (fault codes) and component codes are automatically entered by the expert system and average spectra can be accumulated from available machine tests. For those clients who wish to remain hands off, a system operator can set up the system and maintain the files. On the other hand, the more sophisticated user has all the tools to manage his or her own rule base from baseline information to the specific rules for analysis.

System flexibility is reflected in the ease with which screening criteria (fault codes), CSDM column definitions, diagnostic rule templates and repair recommendations can be created and edited. Furthermore, an entire new major component group can be added for a new machine type by creating a whole set of CSDM column definitions and diagnostic rule templates. The initial input for such a task is based entirely on logical expectations and a certain amount of guessing. Refinement and improvement take place empirically as data for the new component group are collected, processed and analyzed.

This flexibility allows for expanded knowledge of mechanical faults. Direct feedback from the repair shop following vibration tests can be used to confirm or improve certain rules. An unforeseen fault diagnosis or a new machine can be added quickly and easily.

The ability to incorporate data other than vibration spectra into the system is key to future expansion of machine condition analysis. CSDM columns can be added to accept other system parameters as noted above. Diagnostic rule templates can then address not only those individual columns, but sets of columns of diverse parameters. For example, abnormally high 1×harmonics in the vibration spectra combined with an excessive proximity probe reading for a major journal bearing will lead to a more confident diagnosis of journal bearing wear while lube oil analysis results showing high concentration of metallic particles can reinforce spectral evidence of gear wear.

A mature expert system is characterized by thorough VTAG information, full average spectra files (a normal goal is 24 averageable samples per specific machine type), major machine groups with which enough past experience has been accumulated to have prepared refined rules, and a specific knowledge of the idiosyncrasy of individual machines that need to be addressed in the data input files. As the system matures, the diagnostic accuracy improves. A machine that does not meet these criteria is much more likely to produce an incorrect diagnosis.

Various types of faults may be detected by the expert system within the Device 10. Such faults include the following:

Detection of Rolling-Element Bearing Faults Through Base-Band FFT Analysis.

In general, faults in rolling element bearings will produce components in a vibration spectrum that are not synchronous with the running speed of the shaft. Traditional analysis techniques use an algorithm to calculate the frequencies of the bearing-induced components and then search the spectrum for these frequency components. This technique is not very accurate since there are inherent errors in the calculation due to unknown conditions in the bearing such as contact angle, axial loading, numbers of rolling elements and exact identity of the bearing geometry.

A more useful and faster way of detecting bearing problems is to identify non-synchronous components in the spectrum by a process of order normalization. The next step is to eliminate other sources of non-synchronous components by identifying their possible sources, such as drive belts, rotation rates of other components in the machine, and interference from the influence of other nearby machines, etc. Once these components are eliminated, any remaining non-synchronous tones can reliably be assigned to the bearing in question. They can be analyzed for their relative strength and then saved in a format that allows comparisons to future measurements for trending of the level increases over time. This allows the prognosis of the failure of the bearing, this information then leading to scheduling of maintenance procedures for bearing replacement. The accuracy of rolling element bearing diagnostics can be increased through analysis of a demodulated high-frequency noise band.

The aforementioned technique can be inaccurate in situations where there are several rolling-element bearings fairly close to the sensor. Instead of analyzing the base-band vibration signal, the sensor can be used to pick up a high-frequency noise band (above 3 kHz or so), and then perform and amplitude demodulation of the noise signal to recover the bearing signature. Since the sensed noise band is of relatively high frequency, it does not travel very far in the machine structure, so the detected bearing signature is localized to the nearest bearing to the sensor. This eliminates confusion in bearing identification and greatly reduces errors in diagnostics.

Rapid Detection of Rolling Element Bearing Faults by Crest Factor Detection of Vibration Signals.

In many cases it is desired to acquire a "quick look" into a rolling element bearing to find incipient faults without the complexity of performing spectrum analysis of the vibration signature. A valuable way to do this is to measure the RMS value of the vibration signal from a bearing over the frequency range from about 1 kHz to 10 kHz, and then measure the peak value of the same signal over the same frequency range. If high accuracy and repeatability is needed, the measurement can be done by true integration of the levels over 1 minute. The important information in the result is the ratio of the peak level to the RMS level. This is referred to as the "crest factor", and it is a pure dimensionless number expressed in dB.

As a bearing deteriorates, its vibration crest factor will increase from about 3 dB to 8 or 10 dB, whereupon it will begin to decrease as it nears a failure condition. By trending the crest factor, the progression of the deterioration can be tracked, and the condition at any time predicted. Detection of Coupling Misalignment by Phase Analysis of Axial Vibration Components at the Run Speed of the Machine.

It is of vital importance in machine condition monitoring to be able to distinguish conditions of imbalance and misalignment, as it is a waste of time to try to align an unbalanced machine, and conversely, it is a waste of time to try to balance a misaligned machine. Both imbalance and misalignment are notorious for producing vibration spectra that are nearly identical, characterized by high-level components at the turning speed and harmonics of the turning speed.

One way to make the distinction between the two conditions is to measure the turning speed component in the axial direction at the bearing housings at either side of the coupling. If the condition is misalignment, these vibration components will tend towards an out of phase condition, and if the machine condition is dominated by imbalance, these turning speed axial vibrations will tend toward in-phase. The measurements can be made simultaneously in order to obtain phase information, or alternatively, a separate vibration signal that senses the turning speed may be used as a reference for phase, and the axial measurements may be made individually. The processing of the data to determine phase coherence is done within the software in the vibration analyzer.

Detection of Axial Flow Fan and Centrifugal Pump Faults by Vibration Signature Analysis.

Faults in axial flow fans and centrifugal pumps typically cause the vibration component at the number of fan blades or the number of pump impeller vanes to increase in level and complexity. Analysis of the machine vibration signature to detect rising levels at these frequencies and their harmonics will produce a trend that will track the deterioration of the component in questions, and the result can be a diagnosis of the fault as well as a prognosis of the deterioration of the machine's condition.

Detection of Gearing Problems in Mechanical Transmissions through Vibration Sideband Analysis.

If the gears or a gear in a gearbox suffers from wear or damage to a tooth or teeth, the vibration signature of the gearbox will contain a component corresponding to the tooth-mesh rate that will be amplitude and frequency modulated at the turning speed of the respective gear. This modulation will result in evenly-spaced side-bands around the tooth mesh component, and the strength and number of the sidebands will be determined by the type of fault condition and its severity.

Fault Detection by Comparison of Spectral Vibration Levels to Fixed Standards

There are several standard guidelines for acceptable vibration levels of healthy machines that have in some cases, been in use for many years. One of these is the Mil Spec 167-1, which addresses rotating machinery of medium power and speed, but excludes propulsion and reciprocating machines. A later version, Mil Spec 167-2, does cover propulsion turbines. Different industries tend to have formulated different recommendations for these standards that are more specifically tailored to the machine types in question.

A relatively easily implemented fault detection system can be based on comparison of vibration spectra to the applicable standards. To do this properly, spectrum analysis is needed, since most of the standards allow different levels at different frequency ranges.

Fault Detection by Vibration Spectrum Mask Comparison

The vibration spectrum of a smoothly running machine can be stored in a data base and used as a reference with which to compare vibration spectra recorded subsequently at the same point on the machine. This is done by creating a spectrum mask from the reference spectrum. The mask is another vibration spectrum that is higher in level than the reference spectrum measured on the machine. The mask is several dB higher in level than the reference, and the decision for how high to place the mask level depends on many factors, such as the history of fault development in the machine, the machine speed, the criticality of the machine in its function in the plant, etc. The mask can be created by software and then adjusted by a knowledgeable user to represent a reasonable level at which an alarm is to be created triggered/generated.

To make use of the spectrum mask, subsequently recorded vibration spectra are compared in level at each frequency, and if the measured level exceeds the mask level, an alarm is generated. There may be several different severity levels of alarm depending on the mask exceedance level.

Fault Detection by Statistically Derived Average Reference Vibration Spectrum Comparison This is similar to the Spectrum Mask Comparison described above, except that an artificial mask is not used. In this approach, several vibration spectra from a machine or from several machines of the same type are recorded. The spectra are saved in a data-base, and are examined to determine the standard deviations in level differences that exist at the previously identified forcing frequencies that exist in the machine(s). If the standard deviations in level between two spectra do not exceed the RMS level (or the one-sigma level) at any forcing frequency, the spectra are averaged together to create a statistical average that represents the two measured vibration signatures. Then, if other spectra from the same machine or similar machines are available, they are subjected to the same process, and if they meet the criteria explained above, they are averaged into the previous average, creating a new average spectrum that has greater statistical validity. The process is repeated until no more than 24 spectra are included in the average. This averaged spectrum is then used as a reference spectrum for comparison to subsequent measurements of the same machine or machine type. This can be done by examining a subsequently recorded vibration spectrum to see if any of the forcing frequency peaks are greater than one standard deviation higher than the averaged reference spectrum peaks.

The system can be "fine tuned" by modifying the criteria that determine whether the reference spectra are "averageable" and/or modifying the exceedance criteria for fault detection.

Faulft Diagnosis by Statistically Derived Average Reference Vibration Spectrum Comparison The previous discussion deals primarily with fault detection, but the technique is easily extended to allow diagnosis of the nature of the fault as follows:

Any exceedances of the reference plus one standard deviation are flagged and evaluated to determine the nature and the severity of the fault, determined by which fault frequencies exhibit the exceedances and by the amounts of the exceedances. This processing can be performed by the use of a rule-based software expert system that relates fault frequency exceedance combinations and levels to the identity and severity of the underlying faults.

Fault Detection and Diagnosis by Comparison of Displacement, Velocity, and Acceleration Levels In this relatively simple method, the overall vibration displacement, velocity, and acceleration RMS levels are measured, and their values are compared. Since the three parameters accentuate different vibration frequency ranges, and if the speed of the machine is known, it is possible to detect different types of machine faults by analyzing the differences in the three measured parameters. This is a very simple technique, and gives reliable fault detection and fairly accurate fault diagnosis for several common faults, such as imbalance, misalignment, and rolling element bearing wear.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. In an environment including a plurality of machines which are to undergo predictive maintenance, a system for performing predictive maintenance comprising:

a plurality of portable data collector/analyzers operatively configured to communicate with one another; and at least one medium for permitting the plurality of portable data collector/analyzers to communicate with one another at least periodically, wherein each of the portable data collector/analyzers comprises:

a transducer for being attached to a machine included among the plurality of machines, and for producing an output signal indicative of vibration of the machine;

circuitry for conditioning the output signal and converting it to vibration data;

a memory having a database stored therein, the database including vibration data obtained from the plurality of machines; and a database replication engine for replicating data in the database with data in the database of each of the other of the plurality of portable data collector/analyzers, via the at least one medium.

2. The system of claim 1, wherein each portable data collector/analyzer includes a user input which allows a user to add machines to a list of machines stored in the database, and the database replication engine replicates the list of machines in the database with the list of machines in each of the other of the plurality of portable data collector/analyzers.

3. The system of claim 1, wherein the database replication engines of the plurality of portable data collector/analyzers are operative to maintain generally identical data content within each database.

4. The system of claim 1, wherein each of the plurality of portable data collector/analyzers further comprises a diagnostic system for analyzing vibration data obtained from the plurality of machines.

5. The system of claim 4, wherein for a given one of the plurality of portable data collector/analyzers, the diagnostic system included therein analyzes vibration data obtained via the transducer included in the given portable vibration data collector/analyzer based on vibration data obtained from others of the plurality of portable vibration data collector/analyzers via the database replication engine included in the given portable vibration data collector/analyzer.

6. The system of claim 4, wherein results of the vibration data analysis are stored in the database and are included in the data replicated by the database replication engine.

7. The system of claim 1, wherein the database replication engines included in the plurality of portable vibration data collector/analyzers are configured to carry out peer to peer replication of the respective databases.

8. The system of claim 1, wherein the database replication engines perform data replication asynchronously.

9. The system of claim 1, further comprising at least one desktop device including a database and a database replication engine for replicating the contents of the desktop device database with those of the databases of the plurality of portable data collector/analyzers.

10. The system of claim 1, wherein the at least one medium includes at least one of a hardwire connection, an RF connection, an infrared connection, and an Internet connection.

11. In an environment including a plurality of machines which are to undergo predictive maintenance, a method for performing predictive maintenance comprising the steps of:

employing a plurality of portable data collector/analyzers to collect vibration data from the plurality of machines, and storing vibration data collected locally by each of the plurality of portable data collector/analyzers in a corresponding database included in each of the plurality of portable data collector/analyzers; and at least periodically replicating the data included each database of the plurality of portable data collectors with the data included in each database of the others of the plurality of portable data collectors.

12. The method of claim 11, further comprising the step of allowing a user of each portable data collector/analyzer to add machines to a list of machines stored in the database, and wherein the step of replicating includes replicating the list of machines in the database with the list of machines in each of the other of the plurality of portable data collector/analyzers.

13. The method of claim 11, wherein the step of replicating is operative to maintain generally identical data content within each database.

14. The method of claim 11, wherein each of the plurality of portable data collector/analyzers further comprises a diagnostic system for analyzing vibration data obtained from the plurality of machines, and further comprising the step of analyzing the vibration data via the diagnostic system.

15. The method of claim 14, wherein for a given one of the plurality of portable data collector/analyzers, using the diagnostic system included therein to analyze vibration data obtained via the given portable vibration data collector/analyzer, based on vibration data obtained from others of the plurality of portable vibration data collector/analyzers as a result of the step of replicating.

16. The method of claim 14, further including the step of storing results of the vibration data analysis in the database and replicating the results in the other of the portable vibration data collector/analyzers as part of the step of replicating.

17. The method of claim 11, wherein the step of replicating utilizes peer to peer replication among the plurality of portable data collector/analyzers.

18. The method of claim 11, wherein the replication is carried out asynchronously in the step of replicating.

19. The method of claim 11, further including the step of using at least one desktop device including a database and a database replication engine to replicate the contents of the desktop device database with those of the databases of the plurality of portable data collector/analyzers.

20. The method of claim 11, wherein the step of replicating is carried out between the plurality of portable data collector/analyzers by at least one of a hardwire connection, an RF connection, an infrared connection, and an Internet connection.

21. A portable data collector/analyzer, comprising:

a transducer for being attached to a machine in order to produce an output signal indicative of vibration of the machine;

circuitry for conditioning the output signal and converting it to vibration data;

a memory having a database stored therein, the database including vibration data obtained from the machine; and a database replication engine for replicating data in the database with data in a database of each of a plurality of other portable data collector/analyzers.

* * * * *